June 1, 1926.  1,586,646
F. L. BLEVIN ET AL
CARDBOARD BOX KNIFE
Filed July 18, 1924
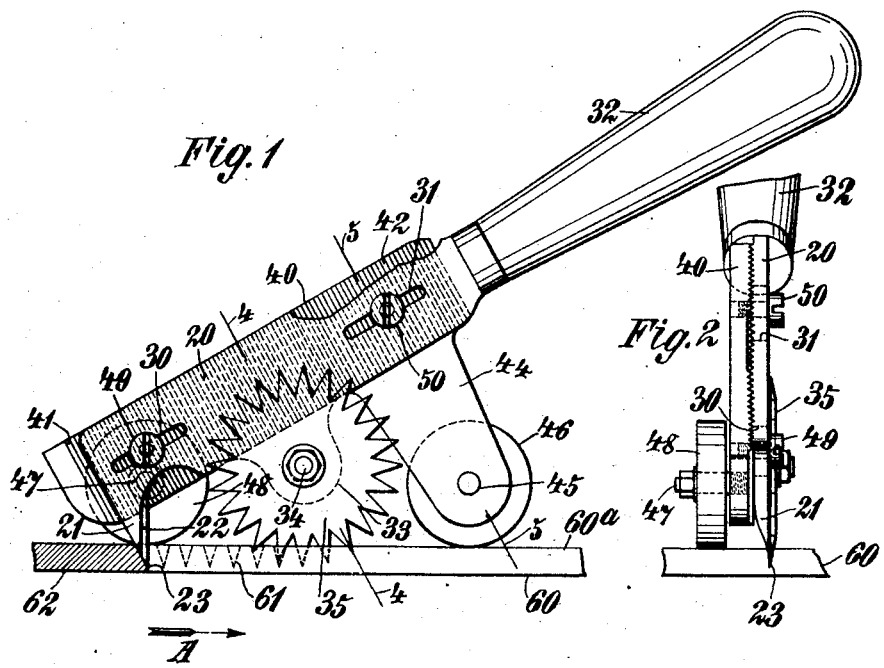
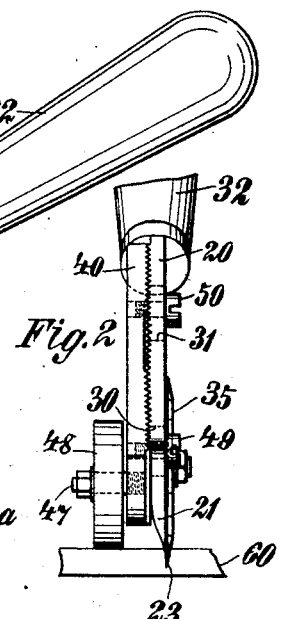
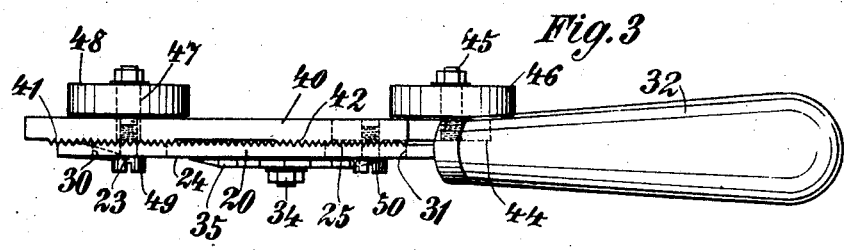
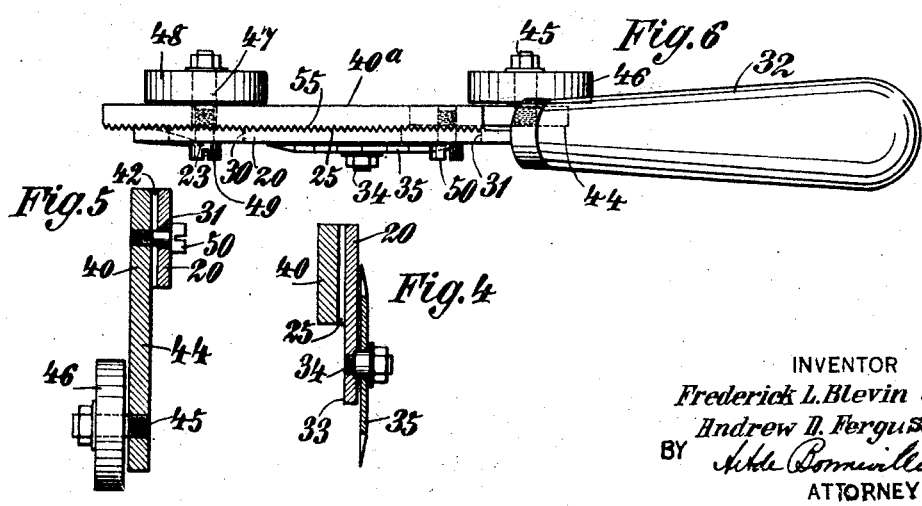
INVENTOR
Frederick L. Blevin and
Andrew D. Ferguson.
BY
ATTORNEY Patented June 1, 1926.

1,586,646

UNITED STATES PATENT OFFICE.

FREDERICK L. BLEVIN, OF JERSEY CITY, NEW JERSEY, AND ANDREW D. FERGUSON, OF BROOKLYN, NEW YORK.

CARDBOARD-BOX KNIFE.

Application filed July 18, 1924. Serial No. 726,766.

This invention relates to a cardboard box knife and the method of cutting a sheet of material.

The object of the invention is the production of a knife, with which the walls of a box can be cut without injuring the contents thereof. A second object is the production of a knife, which can be adjusted to cut through different thicknesses of material to a predetermined depth, so that the cutting edge of the blade of the knife or its peak will not protrude through said material and injure objects below the same. A third object of the invention is the production of a knife which is particularly adapted to cut the walls of cardboard boxes without injury to their contents.

The organization of the invention comprises a knife with a perforating wheel. To the shank of the knife is adjustably attached a bracket, with a pair of guide rollers. The knife when in operative position is inclined to the face of the cardboard or other material operated upon, and the bracket connected thereto can be moved up and down thereon to locate its guide rollers at different levels with respect to the apex of the cutting blade thereof and the axis of the perforating wheel.

In the accompanying drawings Fig. 1 shows a side view of the knife in operative position on a piece of cardboard; Fig. 2 represents a partial left hand side view of Fig. 1; Fig. 3 indicates a top plan view of Fig. 1; Fig. 4 represents a section of Fig. 1 on the line 4, 4; Fig. 5 shows a section of Fig. 1 on the line 5, 5 and Fig. 6 represents a view similar to Fig. 3 with a modification.

The knife comprises the shank 20 which has formed at one end thereof the cutting blade 21 having the cutting edge 22 with the peak 23. The blade 21 is bent laterally to locate the cutting edge 22 with its peak slightly spaced from the face 24 of the shank 20. The other face of the said shank has formed thereon serrations 25 throughout its length, which are preferably at right angles to the longitudinal axis of the shank. The cutting blade 22 and peak 23 are spaced from said face 24 to bring them in line with the heel 35 to be described.

A pair of elongated openings 30 and 31 are formed in the shank 20, and a handle 32 extends from the end thereof, opposite the cutting blade 21. A lug 33 extends from the lower edge of the shank 20. A pivot 34 is supported in the lug 33 and has journaled thereon the perforating wheel 35.

A bracket 40 has formed at the ends of one face thereof the serrations 41 and 42 and has extending therefrom the journal lug 44. A journal pivot 45 extends from the lug 44 and has journaled thereon the guide roller 46. A journal pivot 47 extends from the front end of the bracket 40 and has journaled thereon the guide roller 48.

The bracket 40 is adjustably clamped to the shank 20, by means of the screws 49 and 50, which respectively extend through the elongated openings 30 and 31 and are in threaded engagement with said bracket. The serrations 41 and 42 of the bracket 40 are detachably locked to the serrations 25 of the shank 20. The screws 49 and 50 prevent the separation of the bracket 40 and the shank 20 and the serrations of the bracket and shank prevent any longitudinal movements of said elements when clamped to each other.

In Fig. 6 the shank of the knife is again indicated at 20 with the serrations 25 and the handle 32. The perforating wheel 35 is again journaled on the pivot 34. In place of the bracket 40 there is indicated the bracket 40ª, which has formed therewith the serrations 55 throughout its whole length, which are detachably locked to the serrations 25. The screws 49 and 50, detachably clamp the bracket 40ª to the shank 20. The openings 30 and 31 again serve for the screws 49 and 50, and the journal pivots 45 and 47 have respectively journaled thereon the guide rollers 46 and 48.

To use the knife it is positioned over the material 60 to be cut as indicated in Figs. 1 and 2. The operator grasps the handle 32 and pulls the knife in the direction of the arrow A, by virtue of which the perforating wheel 35 forms a series or line of perforations 61 in the material 60, after which the cutting edge 22 of the cutting blade 21 cuts the material as shown at 62 which is left between said perforations and follows the line thereof. The guide rollers 46 and 48 maintain the peak 23 of the cutting blade and the periphery of the perforating wheel 35 at the proper depth below the top face 60ª of the material 60 operated upon. If it is desired to vary the depth of the cut made by the knife and the depth of the perforations made by the perforating wheel 35, the user unscrews the screws 49 and 50 and disengages the bracket 40 or 40ª from the shank 20, and moves the bracket upwardly if a deeper cut is to be made with the knife and deeper perforations by the wheel 35, or downwardly if a cut and perforations of less depth are to be made. The screws 49 and 50 are then again screwed in place to fasten the bracket 40 or 40ª to the shank 20. It will be noted that to vary the depth of the cut or perforations that the distance between the axes of the rollers 46, 48 and the axis of the wheel 35 and peak 23 must be varied.

Various modifications may be made in the invention and the present exemplification is to be taken as illustrative and not limitative thereof.

Having described our invention what we desire to secure by Letters Patent and claim is:—

1. In a knife of the character described the combination of a knife blade to cut a material operated upon and a perforating wheel coacting with the knife blade to insert a line of perforations in said material and means to simultaneously vary the depth of the cut made with the knife blade and the depth of the perforations made with the perforating wheel.

2. In a knife of the character described the combination of a knife comprising a shank and a cutting blade, a perforating wheel for the shank and journaled below the same, a bracket detachably clamped to said shank and guide rollers journaled to said bracket.

3. In a knife of the character described the combination of a shank and a cutting blade, a perforating wheel for the shank and journaled below the same, a bracket detachably clamped to said shank and constructed to clamp the said shank in different positions thereon and guide rollers journaled to said bracket.

4. In a knife of the character described the combination of a shank with a cutting blade, said shank having an opening and serrations in one of the faces thereof, a perforating wheel for the shank and journaled below the same, a bracket with serrations in one of the faces thereof adapted to lock with the serrations of said shank, said bracket adapted to be located in different positions on said shank, a screw extending through the opening in said shank and engaging a threaded opening in said bracket and a pair of guide rollers for said bracket.

5. In a knife of the character described the combination of a shank with a cutting blade and a pair of elongated openings and having serrations in one of the faces thereof, said shank having a journal lug extending therefrom, a perforating wheel journaled to said lug, a bracket with serrations in one of the faces thereof adapted to lock with the serrations of said shank, said bracket adapted to be located in different positions on said shank, a pair of screws extending through the openings in said shank and engaging threaded openings in said bracket and a pair of guide rollers for said bracket.

Signed at the borough of Manhattan, city of New York in the county of New York and State of New York this 3d day of July A. D. 1924.

FREDERICK L. BLEVIN.
ANDREW D. FERGUSON.